(12) United States Patent
Liu (10) Patent No.: US 10,924,539 B2
(45) Date of Patent: Feb. 16, 2021

(54) METHOD AND DEVICE FOR SELECTING AGGREGATION NODE (71) Applicant: BOE TECHNOLOGY GROUP CO., LTD., Beijing (CN)

(72) Inventor: Chenxu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 465 days.

(21) Appl. No.: 15/985,201

(22) Filed: May 21, 2018

(65) Prior Publication Data
US 2019/0098041 A1 Mar. 28, 2019

(30) Foreign Application Priority Data

Sep. 25, 2017 (CN) .......................... 2017 1 0874880

(51) Int. Cl.
*H04L 29/06* (2006.01)
*H04L 29/08* (2006.01)
*H04W 12/10* (2021.01)
*H04W 4/38* (2018.01)

(52) U.S. Cl.
CPC ...... *H04L 67/1051* (2013.01); *H04L 63/1416* (2013.01); *H04L 67/12* (2013.01); *H04W 4/38* (2018.02); *H04W 12/10* (2013.01); *H04W 12/1008* (2019.01)

(58) Field of Classification Search
CPC . H04L 67/1051; H04L 63/1416; H04L 67/12; H04W 4/38; H04W 12/1008; H04W 12/10
See application file for complete search history.

(56) References Cited

U.S. PATENT DOCUMENTS

2008/0084294 A1 * 4/2008 Zhiying .................. H04W 4/70
340/539.22
2009/0328148 A1 * 12/2009 Lee ......................... H04L 63/12
726/3

(Continued)

FOREIGN PATENT DOCUMENTS

CN 102045708 A * 5/2011 ............ H04W 12/00
CN 102802158 B * 11/2014 ............ H04W 12/12
WO WO2017114939 A1 * 6/2017

*Primary Examiner* — Philip J Chea
*Assistant Examiner* — Wuji Chen
(74) *Attorney, Agent, or Firm* — Nath, Goldberg & Meyer; Joshua B. Goldberg (57) ABSTRACT

A method and a device for selecting an aggregation node are provided. The method includes: acquiring a trust value list for each of nodes in a cluster, the trust value list for each of the nodes including trust values for each of the nodes, acquired by remaining nodes in the cluster; acquiring an actual trust value for each of the nodes according to the trust value list for each of the nodes; calculating an actual remaining energy ratio of each node according to a self-calculated remaining energy ratio of the node calculated by itself and other-calculated remaining energy ratios for the node calculated by the remaining nodes in the cluster; calculating an energy-trust integrated value for each of the nodes according to the actual trust value and the actual remaining energy ratio; and selecting an aggregation node according to the energy-trust integrated values for the nodes.

15 Claims, 3 Drawing Sheets

(56) References Cited

U.S. PATENT DOCUMENTS

| 2011/0078775 A1* | 3/2011 | Yan ..................... H04L 63/1433 |
| | | 726/6 |
| 2015/0186775 A1* | 7/2015 | Cruz Mota ............ G06N 20/00 |
| | | 706/46 |
| 2015/0195296 A1* | 7/2015 | Vasseur ................. H04L 47/127 |
| | | 726/23 |

* cited by examiner

METHOD AND DEVICE FOR SELECTING AGGREGATION NODE

CROSS-REFERENCE TO RELATED APPLICATIONS

The present application claims the priority of Chinese Patent Application No. 201710874880.9, filed on Sep. 25, 2017, the contents of which are incorporated herein in their entirety by reference.

TECHNICAL FIELD

The present disclosure relates to the field of communication technology, and in particular, relates to a method for selecting an aggregation node (which may also be referred to as a fusion node) and a device for selecting an aggregation node.

BACKGROUND

The security of a traditional wireless sensor network is based on technologies of cryptographic mechanisms, such as encryption, decryption, authentication, authorization, and the like. Such technologies can ensure that data is not leaked or tampered, ensure legitimacy of identities of a node and a user, and so on, thereby effectively resisting external attacks. However, a sensor (i.e., a node) is easily captured by a malicious attacker due to characteristics of the sensor. If an external attacker captures a legitimate node in the wireless sensor network, the external attacker can acquire a legal identity, a cryptographic key, and data through the legitimate node to become an internal attacker of the wireless sensor network, thereby destroying the security of the wireless sensor network. If the captured node cannot be identified and excluded from the wireless sensor network in time, it will cause a great security threat to the entire wireless sensor network. Therefore, effective techniques are required to resist internal attacks of the wireless sensor network, to achieve secure data aggregation for the wireless sensor network.

SUMMARY

Embodiments of the present disclosure provide a method for selecting an aggregation node and a device for selecting an aggregation node, each of which has a high security performance.

Some embodiments of the present disclosure provide a method for selecting an aggregation node, including steps of: acquiring a trust value list for each of nodes in a cluster, the trust value list for each of the nodes includes trust values acquired by remaining nodes in the cluster for each of the nodes; acquiring an actual trust value for each of the nodes according to the trust value list for each of the nodes, by using a first predetermined algorithm; calculating an actual remaining energy ratio of each of the nodes according to a self-calculated remaining energy ratio of each of the nodes calculated by itself and other-calculated remaining energy ratios for each of the nodes calculated by the remaining nodes in the cluster, by using a second predetermined algorithm; calculating an energy-trust integrated value for each of the nodes according to the actual trust value for each of the nodes and the actual remaining energy ratio of each of the nodes, by using a third predetermined algorithm; and selecting an aggregation node according to the energy-trust integrated value for each of the nodes.

In an embodiment, any of the trust values in the trust value list is acquired according to the following steps: taking a node for which a trust value is to be acquired as a target node, the remaining nodes in the cluster including the target node as monitoring nodes, one of the monitoring nodes as a direct monitoring node, and others of the monitoring nodes as indirect monitoring nodes; acquiring direct information of the target node through the direct monitoring node; acquiring indirect information of the target node through the direct monitoring node, the indirect information is information of the target node acquired by the indirect monitoring nodes; and calculating the trust value for the target node according to the direct information and the indirect information of the target node, by the direct monitoring node.

In an embodiment, the step of acquiring an actual trust value for each of the nodes according to the trust value list for each of the nodes, by using a first predetermined algorithm includes a step of: calculating, by using an averaging method, an average trust value for each of the nodes as the actual trust value for each of the nodes, according to the trust values in the trust value list for each of the nodes.

In an embodiment, the self-calculated remaining energy ratio of each of the nodes calculated by itself and the other-calculated remaining energy ratios for each of the nodes calculated by the remaining nodes in the cluster are calculated according to steps of: taking a node of which an actual remaining energy ratio is to be calculated as a target node $N_j$, and the remaining nodes in the cluster including the target node $N_j$ as monitoring nodes $N_l$; performing a normalization process by using an initial energy $W_{init,jj}$ and a current energy $W_{now,jj}$ of the target node $N_j$ recorded by itself, to acquire a self-calculated remaining energy ratio $\lambda_{j,j}$ as follows:

$$\lambda_{j,j} = \frac{W_{now,jj}}{W_{init,jj}};$$

and detecting an initial energy $W_{init,lj}$ and a current energy $W_{now,lj}$ of the target node $N_j$ through each of the monitoring nodes $N_l$, and calculating an other-calculated remaining energy ratio $\lambda_{l,j}$ for the target node $N_j$ as follows:

$$\lambda_{l,j} = \frac{W_{now,lj}}{W_{init,lj}},$$

a step of calculating an actual remaining energy ratio $\lambda_j$ of the target node $N_j$ includes a step of: calculating the actual remaining energy ratio of the target node $N_j$ by using the equation of $$\lambda_j = t \cdot \lambda_{j,j} + s \cdot \frac{\sum_l \lambda_{l,j}}{h};$$

where h is a quantity of the monitoring nodes $N_l$, t is a direct determination weighted parameter for the self-calculated remaining energy ratio of the target node $N_j$ acquired by the normalization process, s is an indirect determination weighted parameter for the other-calculated remaining energy ratios acquired by the monitoring nodes $N_l$ for the target node $N_j$, t+s=1, 0≤t≤1 and 0≤s≤1.

In an embodiment, the step of calculating an energy-trust integrated value for each of the nodes according to the actual trust value for each of the nodes and the actual remaining energy ratio of each of the nodes, by using a third predetermined algorithm, includes calculating an energy-trust integrated value $Q_k$ for each of the nodes by using the following equation: $Q_K = 100 \cdot T_k + \theta \cdot \lambda_k$, where, $T_k$ is the actual trust value, $\lambda_k$ is the actual remaining energy ratio, $\varphi$ is a weighted parameter for the actual trust value, $\theta$ is a weighted parameter for the actual remaining energy ratio, $\varphi + \theta = 1$, $0 \leq \theta \leq 1$ and $0 \leq \varphi \leq 1$.

In an embodiment, the step of selecting an aggregation node according to the energy-trust integrated value for each of the nodes includes steps of: comparing energy-trust integrated values for the nodes with each other, and selecting a node having a maximum energy-trust integrated value as an aggregation node.

In an embodiment, the step of selecting an aggregation node according to the energy-trust integrated value for each of the nodes includes steps of: comparing the actual trust value for each of the nodes with a threshold value, and acquiring nodes each having the actual trust value larger than the threshold value as candidate nodes; and comparing the energy-trust integrated values for the candidate nodes with each other, and selecting the candidate node having a maximum energy-trust integrated value as an aggregation node.

Embodiments of the present disclosure provide a device for selecting an aggregation node, including: an acquisition unit, configured to acquire a trust value list for each of nodes in a cluster, the trust value list for each of the nodes includes trust values for each of the nodes, acquired by remaining nodes in the cluster; a first calculator, configured to calculate an actual trust value for each of the nodes according to the trust value list for each of the nodes, by using a first predetermined algorithm; a second calculator, configured to calculate an actual remaining energy ratio of each of the nodes according to a self-calculated remaining energy ratio of the node calculated by itself and other-calculated remaining energy ratios for each of the nodes calculated by remaining nodes in the cluster, by using a second predetermined algorithm; a third calculator, configured to calculate an energy-trust integrated value for each of the nodes according to the actual trust value for each of the nodes and the actual remaining energy ratio of each of the nodes, by using a third predetermined algorithm; and a selector, configured to select an aggregation node according to the energy-trust integrated value for each of the nodes.

In an embodiment, the first calculator is further configured to calculate, by using an averaging method, an average trust value for each of the nodes as the actual trust value of the node, according to the trust values in the trust value list for each of the nodes.

In an embodiment, the selector is further configured to compare the energy-trust integrated values for the nodes with each other, and select a node having a maximum energy-trust integrated value as an aggregation node.

In an embodiment, the selector includes: a first comparator, configured to compare the actual trust value for each of the nodes with a threshold value, and acquire nodes each having the actual trust value larger than the threshold value as candidate nodes; and a second comparator, configured to compare the energy-trust integrated values for the candidate nodes with each other, and select the candidate node having a maximum energy-trust integrated value as an aggregation node.

DETAILED DESCRIPTION

To make ordinary skilled persons in the art better understand technical solutions provided by the present disclosure, the present disclosure will be further described in detail below with reference to the accompanying drawings and the following embodiments.

In a wireless sensor network, resources of a single sensor such as energy, computing ability, storage capacity, communication bandwidth, and the like, are usually limited. Thus, there are many limitations in a case where a single sensor is employed to monitor an entity. Therefore, a plurality of sensors may be required to monitor a single entity in parallel, to achieve accuracy and reliability of the data collected for a monitored object. However, the cooperation of the plurality of sensors (i.e., nodes) will result in a large amount of redundancy in the data collected by the nodes. In order to reduce redundant data, improve data collection efficiency, and avoid the waste of energy and bandwidth, a data aggregation technology is proposed accordingly. The data aggregation technology has become a very critical data processing technology for the wireless sensor network, and it can aggregate a plurality of pieces of data, so as to remove redundant data and generate more meaningful data that better meets user's requirements. While increasing the energy efficiency and the bandwidth efficiency, continuous data aggregation will also bring some negative effects on the security of the wireless sensor network. The security threats to the data aggregation technology for the wireless sensor network mainly include two aspects as follows: (1) attacks on the structure of the wireless sensor network: attackers disturbs the generation of a data aggregation tree and the data aggregation process by issuing false routing information and illegal data; such attacks are mainly employed to disturb the operation of an aggregation node, increase delays of the wireless sensor network, and consume the energy of a node; and (2) attack on data: for example, an attacker can introduce illegal data into the wireless sensor network through a captured node or a fake node, intercept and acquire aggregation data by monitoring a channel or capturing an aggregation node, re-send data, cause a captured aggregation node to maliciously give up lower-level nodes, and so on. It can be seen that an aggregation technology of a wireless sensor network must consider both data aggregation and security, so as to achieve secure data aggregation.

In view of the foregoing description, the present disclosure provides a method for selecting an aggregation node and a device for selecting an aggregation node, which have a high security performance.

Figure 3:
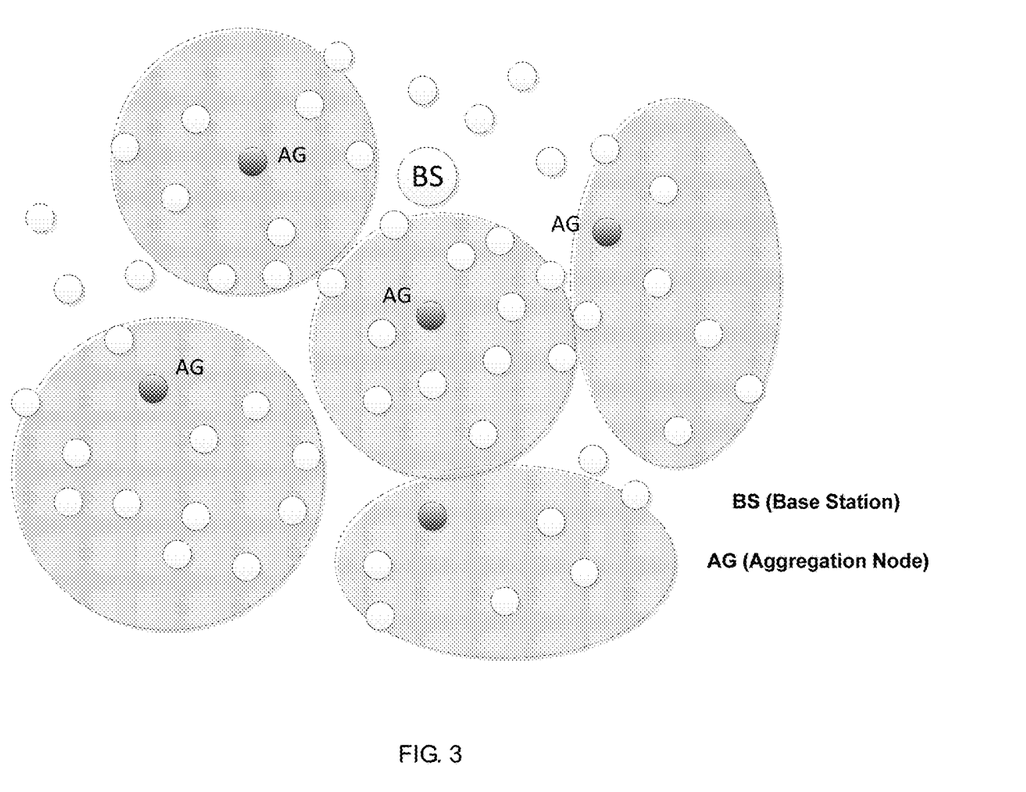
FIG. 3 is a schematic diagram showing a structure of a wireless sensor network.

As shown in FIG. 3, a sensor network can include a base station BS and a plurality of clusters (as indicated by dotted rings in FIG. 3). Each of the clusters can include a plurality of sensors, also referred to as nodes, (as indicated by circles in FIG. 3). Each of the clusters can include an aggregation node AG, and the aggregation node AG can perform data aggregation.

Figure 1:
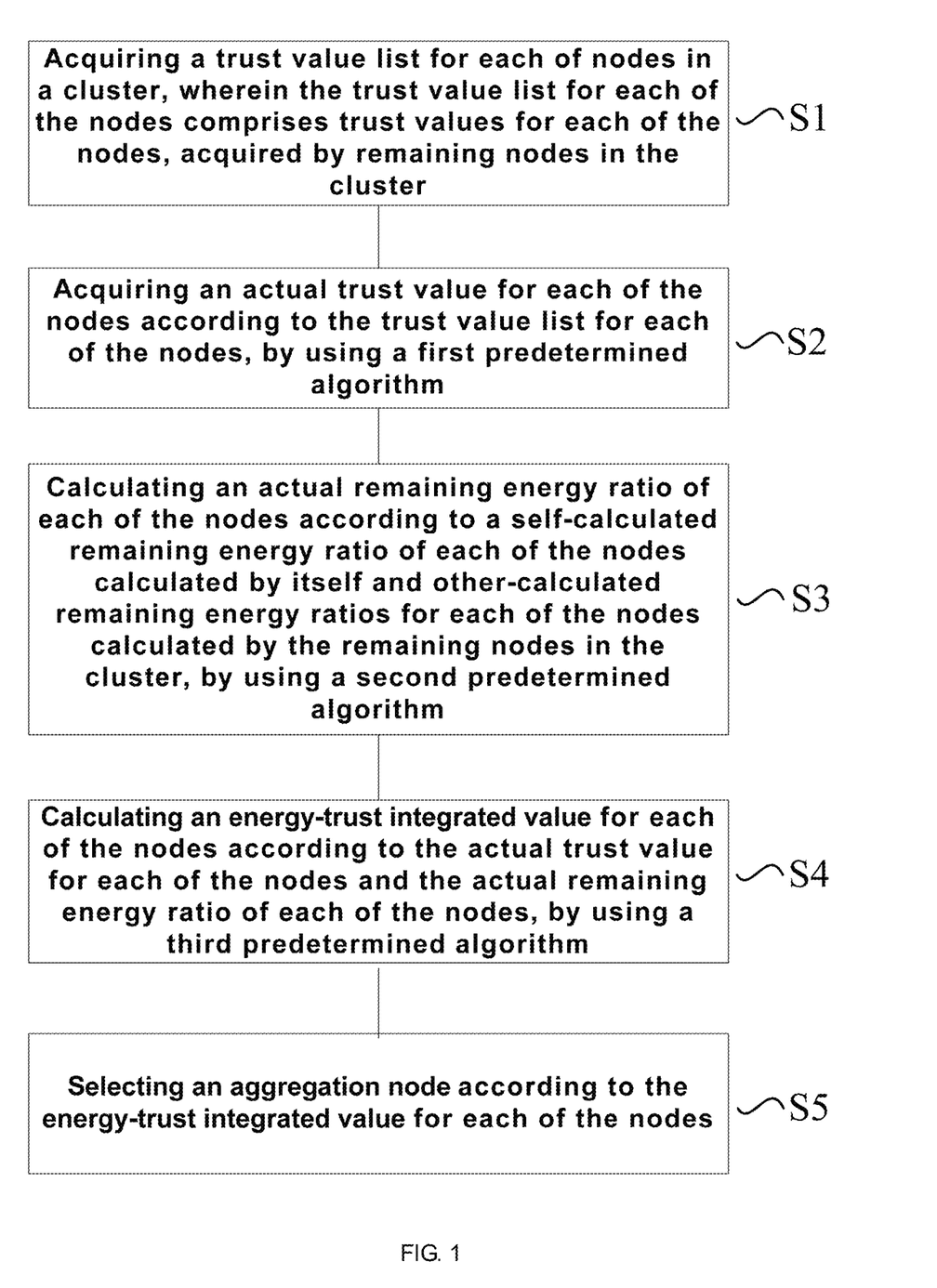
FIG. 1 is a flowchart showing a method for selecting an aggregation node according to an embodiment of the present disclosure.

As shown in FIG. 1, an embodiment of the present disclosure provides a method for selecting an aggregation node. The method can include following steps S1 to S5.

In step S1, a trust value list for each of nodes in a cluster is acquired. In an embodiment, the trust value list for each of the nodes includes trust values for each of the nodes, acquired by remaining nodes in the cluster.

For example, description will be made by taking a case where a cluster of the network includes n nodes and a trust value for a node will be calculated as an example. For example, a node for which a trust value will be acquired is taken as a target node $N_j$, the remaining nodes in the cluster in which the target node $N_j$ is located are taken as monitoring nodes, one of the monitoring nodes is taken as a direct monitoring node $N_i$, and others of the monitoring nodes are taken as indirect monitoring nodes $N_k$ (k=1, 2, 3 . . . n, k≠i, j). The direct monitoring node $N_i$ monitors an operation of the target node $N_j$, and acquires the observation results (e.g., the size, speed and direction of a moving object, a seismic signal, an electromagnetic signal, a temperature, a humidity, a noise, a light intensity, a pressure, a soil composition, and the like) of the target node $N_j$. That is, the direct monitoring node $N_i$ acquires direct information (e.g., an initial energy and a current energy) about the target node $N_j$. Meanwhile, the indirect monitoring nodes $N_k$ also monitors the operation of the target node $N_j$, and acquires the observation results for the target node $N_j$. The direct monitoring node $N_i$ collects the results obtained by the indirect monitoring nodes $N_k$, i.e., collects indirect information (e.g., an initial energy and a current energy) about the target node $N_j$. Finally, the direct monitoring node $N_i$ integrates the direct information and the indirect information, to calculate a trust value for the target node $N_j$. For example, the direct monitoring node $N_i$ can set weights for the direct information and the indirect information, respectively, and multiply the direct information and the indirect information by their weights, respectively, to acquire respective values, and finally acquire the sum of the respective values.

In the above-described way, the trust value for each of the nodes can be acquired. Further, a trust value list including the trust values for each of the nodes, acquired by the remaining nodes in the cluster can be obtained.

Description will be further made by taking a case where the direct monitoring node $N_i$ calculates a trust value of a data acquisition operation of the target node $N_j$ as an example. A calculation method of a trust value for a data aggregation operation or a data transmission operation of the target node $N_j$ is the same as that for data acquisition operation. Two nodes $N_i$ and $N_j$ monitor and observe each other, and a reputation list for the target node can be updated by overall considering current situation and history situation. As described above, the direct monitoring node $N_i$ monitors and observes the operation of the target node $N_j$. The observation results can be determined by using the known Beta distribution, and results of the determination include a good result and a bad result. The direct monitoring node $N_i$ periodically observes the target node $N_j$. A quantity of good results and a quantity of bad results acquired by the direct monitoring node $N_i$ observing the current data acquisition operation of the target node $N_j$ are denoted by the parameters $m_{ij}$ and $n_{ij}$, respectively. A good result parameter and a bad result parameter acquired by the direct monitoring node $N_i$ for observing the previous data acquisition operation of the target node $N_j$ are denoted by $\alpha_{i,j}^{now}$ and $\beta_{i,j}^{now}$ (which are parameters of the Beta distribution), respectively. Thus, the direct monitoring node $N_i$ calculates new parameters $\alpha_{i,j}^{new}$ and $\beta_{i,j}^{new}$ as follows:

$$\alpha_{i,j}^{new} = p * \alpha_{i,j}^{now} + m_{i,j} + q * \sum_{k \in N} R(m_{k,j}),$$

$$\beta_{i,j}^{new} = p * \beta_{i,j}^{now} + n_{i,j} + q * \sum_{k \in N} R(n_{k,j}),$$

where N denotes a set of {k=1, 2, . . . , n, k≠i. j}, $R(m_{k,j})$ and $R(n_{k,j})$ (k=1, 2, . . . , n, k≠j) denote exchanging observation results for the target node $N_j$ between the direct monitoring node $N_i$ and the indirect monitoring nodes $N_k$ (k=1, 2, . . . , n, k≠I, j), i.e., indirect information for the target node $N_j$ collected by the direct monitoring node $N_i$, as follows:

$$\sum_{k \in N} R(m_{k,j}) = \frac{\sum_k m_{k,j}}{w}, w \leq n - 2,$$

$$\sum_{k \in N} R(n_{k,j}) = \frac{\sum_k n_{k,j}}{w}, w \leq n - 2.$$

As described above, $\alpha_{i,j}^{now}$ and $\beta_{i,j}^{now}$ are the good parameter and the bad parameter for the results of the previous observation acquired by the node $N_i$. The parameters for the results of the previous observation have certain influence on the evaluation of a model, but the influence is less than that of the good parameter and the bad parameter for the results of the current observation. Thus, an attenuation parameter p can be set as p<1, and an weighted operation can be performed to acquire $p*\alpha_{i,j}^{now}$ and $p*\beta_{i,j}^{now}$. In consideration of the results of the current observation, the new good and bad parameters $\alpha_{i,j}^{new}$ and $\beta_{i,j}^{new}$ can be acquired. An attenuation parameter q for indirect observation results can be set as q≤1, and denotes the importance of indirect observation results. Reputation value $R_{ij}$ and trust value $T_{ij}$ for the data acquisition operation of the target node $N_j$ can be calculated by using the Beta distribution, as follows:

$$R_{i,j} = \text{Beta}(\alpha_{i,j}^{new} + 1, \beta_{i,j}^{new} + 1)$$
$$= \frac{\Gamma(\alpha_{i,j}^{new} + 1 + \beta_{i,j}^{new} + 1)}{\Gamma(\alpha_{i,j}^{new} + 1) \cdot \Gamma(\beta_{i,j}^{new} + 1)} \varphi^{(\alpha_{i,j}^{new}+1)}(1-\varphi)^{(\beta_{i,j}^{new}+1)-1},$$

$$T_{i,j} = E(R_{i,j}) = \frac{\alpha_{i,j}^{new} + 1}{\alpha_{i,j}^{new} + \beta_{i,j}^{new} + 2}.$$

According to the observation results of the direct monitoring node $N_i$, a trust value for the data acquisition operation of the target node $N_j$ can be calculated.

In step S2, an actual trust value for each of the nodes can be acquired according to the trust value list for each of the nodes, by using a first predetermined algorithm (e.g., an averaging method).

In an embodiment, each of the nodes in each cluster of the network can form with a trust value list including the trust values for each of the nodes, acquired by the remaining nodes in the cluster, and transmit the trust value list to the aggregation node (e.g., a default aggregation node or a previously determined aggregation node) in the cluster. The aggregation node can calculate an average trust value for each of the nodes in the cluster according to the trust value lists of all nodes in the cluster. For example, in a case where an average trust value $T_j$ for the target node $N_j$ is to be calculated, the average trust value $T_j$ can be calculated by using the following equation:

$$T_j = \frac{\sum_{i=0, i \neq j}^{n} T_{i,j}}{n-1}, j = 1 \ldots n,$$

where n is a quantity of the nodes in the cluster including the target node $N_j$.

In such a method, the average trust value for each of the nodes in a cluster can be calculated.

In step S3, an actual remaining energy ratio of each of the nodes is calculated according to a self-calculated remaining energy ratio of each of the nodes calculated by itself and other-calculated remaining energy ratios for each of the nodes calculated by the remaining nodes in the cluster, by using a second predetermined algorithm (e.g., a combination of a normalization method and a weighted method).

Specifically, in order to increase the reliability and the energy efficiency of data aggregation, each node not only detects operation of its neighbor nodes and evaluates the reputation values and trust values for its surrounding nodes, but also records its own energy. In a case where an initial energy of the target node $N_j$ is $W_{init,jj}$ and a current energy of the target node $N_j$ is $W_{now,jj}$, a normalization process can be performed to obtain the self-calculated remaining energy ratio $\lambda_{j,j}$ of the target node $N_j$, as follows:

$$\lambda_{j,j} = \frac{W_{now,jj}}{W_{init,jj}}.$$

Each of the monitoring nodes $N_l$ (nodes other than the target node $N_j$ in the cluster in which the target node $N_j$ is located) of the target node $N_j$ (l=1, 2, . . . , h) (h=n−1) acquires detection results for the target node $N_j$, i.e., each of the monitoring nodes $N_l$ detects that an initial energy of the target node $N_j$ is $W_{init,lj}$ and a current energy of the target node $N_j$ is $W_{now,lj}$ and calculate the other-calculated remaining energy ratio $\lambda_{l,j}$ for the target node $N_j$ as follows:

$$\lambda_{l,j} = \frac{W_{now,lj}}{W_{init,lj}};$$

The current aggregation node acquires the remaining energy ratio (i.e., the self-calculated remaining energy ratio) $\lambda_{j,j}$ of the target node $N_j$ recorded by the target node $N_j$ itself and other-calculated remaining energy ratios $\lambda_{l,j}$ for the target node $N_j$ calculated by the monitoring nodes $N_l$ (l=1, 2, . . . , h), and calculates an actual remaining energy ratio of the current node (i.e., the target node $N_j$), as follows:

$$\lambda_j = t \cdot \lambda_{j,j} + s \cdot \frac{\sum_l \lambda_{l,j}}{h},$$

where h is a quantity of the monitoring nodes $N_l$, t is a direct determination weighted parameter for the self-calculated remaining energy ratio of the target node $N_j$ acquired through the normalization process performed by the target node $N_j$, s is an indirect determination weighted parameter for the other-calculated remaining energy ratios acquired by the monitoring nodes $N_l$ for the target node $N_j$, t+s=1, 0≤t≤1 and 0≤s≤1. The larger the parameter t is, the more the arrogation node trust the remaining energy ratio calculated by the target node $N_j$ itself (i.e., the self-calculated remaining energy ratio).

In step S4, an energy-trust integrated value for each of the nodes is calculated according to the actual trust value for each of the nodes and the actual remaining energy ratio of each of the nodes, by using a third predetermined algorithm (e.g., a weighted method).

For example, an energy-trust integrated value $Q_k$ for each of the nodes can be calculated by using the equation of $Q_K = \varphi \cdot T_k + \theta \cdot \lambda_k$, where $T_k$ is the actual trust value, $\lambda_k$ is the actual remaining energy ratio, $\varphi$ is a weighted parameter for the actual trust value, $\theta$ is a weighted parameter for the actual remaining energy ratio, $\varphi+\theta=1$, 0≤θ≤1 and 0≤φ≤1.

According to the above equation, the energy-trust integrated value $Q_j$ for the target node $N_j$ can be calculated as $Q_j = \varphi \cdot T_j + \theta \cdot \lambda_j$.

In step S5, a new aggregation node can be selected according to the energy-trust integrated value for each of the nodes.

For example, the energy-trust integrated values for the nodes can be compared with each other, and a node having a maximum energy-trust integrated value can be selected as a new aggregation node.

It should be noted that the selection manner of step S5 is not limited to the above manner. Alternatively, the actual trust value for each of the nodes can be compared with a threshold value, and the nodes each having the actual trust values larger than the threshold value can be selected as candidate nodes. Among the candidate nodes, the candidate node having the maximum energy-trust integrated value can be selected as the new aggregation node.

It should be noted that, the actual trust value and the energy-trust integrated value for each of the nodes in a cluster can be periodically recalculated according to the operation of the network during the operation of the network, after the wireless sensor network has been operating for a period of time. the new aggregation node can be re-selected according to the steps S1 to S5.

In the method for selecting an aggregation node provided by the present embodiment, a trust value for each of the nodes and a remaining energy ratio of each of the nodes are fully considered, and a trust management model and an energy-trust integrated model are established for each of the nodes. During the operation of the network, the trust value for each of the nodes is determined by using the trust management model, and a set of nodes having a larger trust value and a higher security is selected from all nodes within the network. Then, a node having a larger energy-trust integrated value is selected as an aggregation node, from the secure set of nodes according to the energy-trust integrated model. In this way, the security and the remaining energy ratio of each of the nodes are fully taken into consideration, so that the selected aggregation node can not only meet the required security to effectively resist internal attacks of the wireless sensor network, but also have sufficient remaining energy to ensure the uniformity of energy consumption of the nodes in the network so as to effectively extend the lifespan of the network. The novel trust management model employed in the method for selecting an aggregation node can effectively overcome the defect that the traditional security algorithm cannot effectively resist the internal attacks, can effectively identify a malicious node within the network, and fully consider the energy management of the wireless sensor network to ensure that the aggregation node has sufficient energy to undertake corresponding network tasks.

Figure 2:
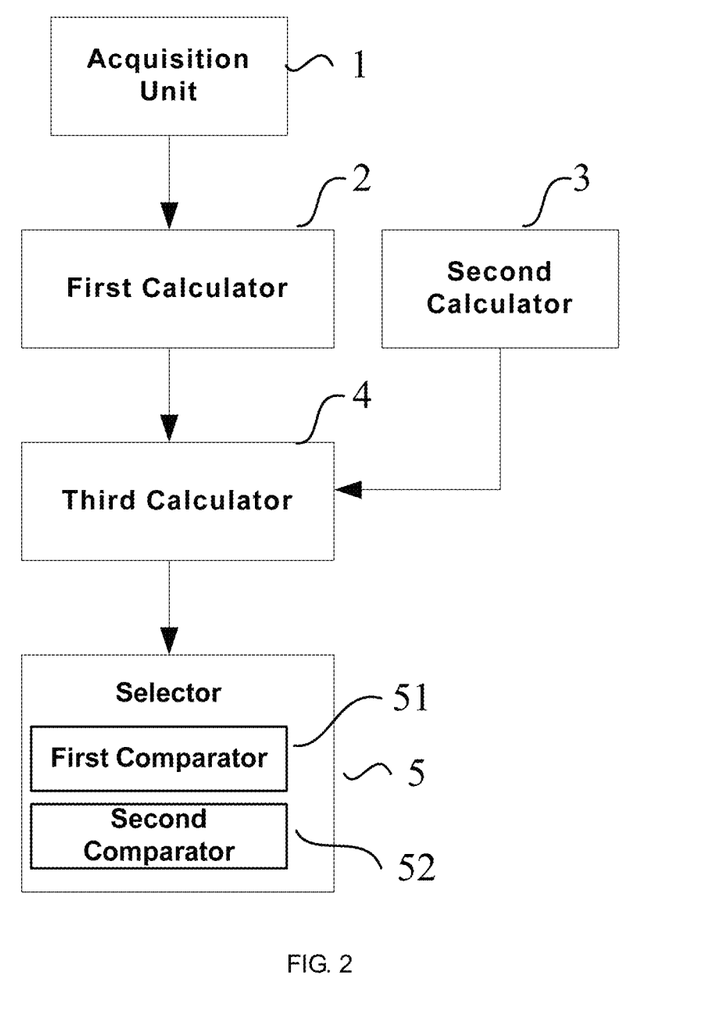
FIG. 2 is a schematic diagram showing a device for selecting an aggregation node according to an embodiment of the present disclosure.

As shown in FIG. 2, another embodiment of the present disclosure provides a device for selecting an aggregation node. The device for selecting an aggregation node can be employed to carry out the method for selecting an aggregation node provided by the embodiment corresponding to FIG. 1. The device for selecting an aggregation node can include an acquisition unit 1, a first calculator 2, a second calculator 3, a third calculator 4, and a selector 5.

In an embodiment, the acquisition unit 1 can be configured to acquire a trust value list for each of nodes in a cluster. For example, the trust value list for each of the nodes includes trust values for each of the nodes, acquired by the remaining nodes in the cluster. For example, the acquisition unit 1 can be implemented by a central processing unit (CPU), a microprocessor, an integrated circuit (IC), or the like, which has the function as described above.

The first calculator 2 is configured to calculate an actual trust value for each of the nodes according to the trust value list for each of the nodes, by using the first predetermined algorithm. In some implementations, the first calculator 2 can be configured to calculate, by using an averaging method, an average trust value for each of the nodes as the actual trust value for each of the nodes, according to the trust values in the trust value list for each of the nodes. For example, the first calculator 2 is further configured to calculate, by using an averaging method, an average trust value for one node as the actual trust value for the one node, according to the trust values of the one node in the trust value lists of the remaining nodes in a cluster in which the one node is located.

The second calculator 3 is configured to calculate an actual remaining energy ratio of each of the nodes according to a self-calculated remaining energy ratio of each of the nodes calculated by itself and other-calculated remaining energy ratios for each of the nodes calculated by the remaining nodes in the cluster, by using the second predetermined algorithm.

The third calculator 4 is configured to calculate an energy-trust integrated value for each of the nodes according to the actual trust value for each of the nodes and the actual remaining energy ratio for each of the nodes, by using the third predetermined algorithm.

The selector 5 is configured to select a new aggregation node according to the energy-trust integrated value for each of the nodes. In an embodiment, the selector 5 can be configured to compare the energy-trust integrated values for the nodes with each other, and select a node having the maximum energy-trust integrated value as the new aggregation node.

Alternatively, in an embodiment, the selector 5 can include a first comparator 51 and a second comparator 52. The first comparator 51 can be configured to compare the actual trust value of each of the nodes with a threshold value which can be set as desired in advance, and acquire the nodes each having the actual trust value larger than the threshold value as candidate nodes. The second comparator 52 can be configured to compare the energy-trust integrated values of the candidate nodes with each other, and select the candidate node having the maximum energy-trust integrated value as the new aggregation node.

The device for selecting an aggregation node provided by the present embodiment can select an aggregation node by using the method provided by the embodiment corresponding to FIG. 1. Thus, the trust value for each of the nodes and the remaining energy ratio of each of the nodes are fully considered, and a trust management model and an energy-trust integrated model are established for each of the nodes. During the operation of the network, the trust value for each of the nodes is determined by using the trust management model, and a set of nodes having a larger trust value and a higher security is selected from all nodes within the network. Then, a node having a larger energy-trust integrated value is selected, as an aggregation node, from the secure set of nodes according to the energy-trust integrated model. In this way, the security and the remaining energy ratio of each node are fully taken into consideration, so that the selected aggregation node can not only meet the required security to effectively resist internal attacks of the wireless sensor network, but also have sufficient remaining energy to ensure the uniformity of energy consumption of the nodes in the network so as to effectively extend the lifespan of the network. The novel trust management model employed in the device for selecting an aggregation node can effectively overcome the defect that the traditional security algorithm cannot effectively resist the internal attacks, can effectively identify a malicious node within the network, and fully consider the energy management of the wireless sensor network to ensure that the aggregation node has sufficient energy to undertake corresponding network tasks.

It should be noted that, each of the acquisition unit 1, the first calculator 2, the second calculator 3, the third calculator 4, the selector 5, the first comparator 51, and the second comparator 52 in the present embodiment can be implemented by hardware, software, or the combination thereof. For example, the hardware can be an integrated circuit (IC) having respective functions provided by the present disclosure. The combination of hardware and software can be implemented by installing at least one software implementing the functions of respective components on at least one general purpose computer, upon executed by a CPU of the general purpose computer, the software causes the CPU to implement the respective components in the present embodiment.

It should be understood that, the above embodiments are only exemplary embodiments for the purpose of explaining the principle of the present disclosure, and the present disclosure is not limited thereto. For an ordinary skilled person in the art, various variants and modifications can be made without departing from the spirit and essence of the present disclosure. These variants and modifications also fall within the protection scope of the present disclosure.

What is claimed is:

1. A method for selecting an aggregation node, comprising steps of:

acquiring a trust value list for each of nodes in a cluster, wherein the trust value list for each of the nodes comprises trust values for each of the nodes, acquired by remaining nodes in the cluster;

acquiring an actual trust value for each of the nodes according to the trust value list for each of the nodes, by using a first predetermined algorithm;

calculating an actual remaining energy ratio of each of the nodes according to a self-calculated remaining energy ratio of each of the nodes calculated by itself and other-calculated remaining energy ratios for each of the nodes calculated by the remaining nodes in the cluster, by using a second predetermined algorithm;

calculating an energy-trust integrated value for each of the nodes according to the actual trust value for each of the nodes and the actual remaining energy ratio of each of the nodes, by using a third predetermined algorithm; and selecting an aggregation node according to the energy-trust integrated value for each of the nodes, wherein any of the trust values in the trust value list is acquired according to the following steps:

taking a node for which the trust value is to be acquired as a target node, the remaining nodes in the cluster comprising the target node as monitoring nodes, one of the monitoring nodes as a direct monitoring node, and others of the monitoring nodes as indirect monitoring nodes;

acquiring direct information of the target node through the direct monitoring node;

acquiring indirect information of the target node through the direct monitoring node, wherein the indirect information is information of the target node acquired by the indirect monitoring nodes; and calculating the trust value for the target node according to the direct information and the indirect information of the target node which are collected by the direct monitoring node; and wherein the step of selecting an aggregation node according to the energy-trust integrated value for each of the nodes comprises steps of:

comparing the energy-trust integrated values of the nodes with each other, and selecting a node having a maximum energy-trust integrated value as the aggregation node.

2. The method according to claim 1, wherein the step of acquiring an actual trust value for each of the nodes according to the trust value list for each of the nodes, by using a first predetermined algorithm comprises a step of:

calculating, by using an averaging method, an average trust value for each of the nodes as the actual trust value of each of the nodes, according to the trust values in the trust value list for each of the nodes.

3. A method for selecting an aggregation node, comprising steps of:

acquiring a trust value list for each of nodes in a cluster, wherein the trust value list for each of the nodes comprises trust values for each of the nodes, acquired by remaining nodes in the cluster;

acquiring an actual trust value for each of the nodes according to the trust value list for each of the nodes, by using a first predetermined algorithm;

calculating an actual remaining energy ratio of each of the nodes according to a self-calculated remaining energy ratio of each of the nodes calculated by itself and other-calculated remaining energy ratios for each of the nodes calculated by the remaining nodes in the cluster, by using a second predetermined algorithm;

calculating an energy-trust integrated value for each of the nodes according to the actual trust value for each of the nodes and the actual remaining energy ratio of each of the nodes, by using a third predetermined algorithm; and selecting an aggregation node according to the energy-trust integrated value for each of the nodes, wherein the self-calculated remaining energy ratio of each of the nodes calculated by itself and the other-calculated remaining energy ratios for each of the nodes calculated by the remaining nodes in the cluster are calculated according to steps of:

taking a node of which the actual remaining energy ratio is to be calculated as a target node $N_j$, and remaining nodes in the cluster comprising the target node $N_j$ as monitoring nodes $N_l$;

performing a normalization process by using an initial energy $W_{init,jj}$ and a current energy $W_{now,jj}$ of the target node $N_j$ recorded by itself, to acquire the self-calculated remaining energy ratio $\lambda_{j,j}$ as follows:

$$\lambda_{j,j} = \frac{W_{now,jj}}{W_{init,jj}};$$

and detecting an initial energy $W_{init,lj}$ and a current energy $W_{now,\ lj}$ of the target node $N_j$ through each of the monitoring nodes $N_l$, and calculating the other-calculated remaining energy ratios $\lambda_{l,j}$ for the target node $N_j$ as follows:

$$\lambda_{l,j} = \frac{W_{now,lj}}{W_{init,lj}};$$

wherein a step of calculating an actual remaining energy ratio $\lambda_j$ of the target node $N_j$ comprises a step of:

calculating the actual remaining energy ratio of the target node $N_j$ by using the equation of $$\lambda_j = t \cdot \lambda_{j,j} + s \cdot \frac{\sum_l \lambda_{l,j}}{h};$$

where h is a quantity of the monitoring nodes $N_l$, t is a direct determination weighted parameter for the self-calculated remaining energy ratio of the target node $N_j$ acquired by the normalization process, s is an indirect determination weighted parameter for the other-calculated remaining energy ratios acquired by the monitoring nodes $N_l$ for the target node $N_j$, t+s=1, 0≤t≤1 and 0≤s≤1.

4. The method according to claim 1, wherein the step of calculating an energy-trust integrated value for each of the nodes according to the actual trust value for each of the nodes and the actual remaining energy ratio of each of the nodes, by using a third predetermined algorithm, comprises calculating the energy-trust integrated value $Q_k$ of each of the nodes by using the following equation:

$$Q_K = \varphi \cdot T_k + \theta \cdot \lambda_k$$

where $T_k$ is the actual trust value, $\lambda_k$ is the actual remaining energy ratio, $\varphi$ is a weighted parameter for the actual trust value, $\theta$ is a weighted parameter for the actual remaining energy ratio, $\varphi+\theta=1$, 0≤θ≤1 and 0≤φ≤1.

5. The method according to claim 3, wherein the step of selecting an aggregation node according to the energy-trust integrated value for each of the nodes comprises steps of:

comparing the energy-trust integrated values of the nodes with each other, and selecting a node having a maximum energy-trust integrated value as the aggregation node.

6. The method according to claim 1, wherein the step of selecting an aggregation node according to the energy-trust integrated value for each of the nodes comprises steps of:

comparing the actual trust value of each of the nodes with a threshold value, and acquiring nodes each having the actual trust value larger than the threshold value as candidate nodes; and comparing the energy-trust integrated values for the candidate nodes with each other, and selecting the candidate node having a maximum energy-trust integrated value as the aggregation node.

7. The method according to claim 2, wherein the step of selecting an aggregation node according to the energy-trust integrated value for each of the nodes comprises steps of:

comparing the actual trust value of each of the nodes with a threshold value, and acquiring nodes each having the actual trust value larger than the threshold value as candidate nodes; and comparing the energy-trust integrated values for the candidate nodes with each other, and selecting the candidate node having a maximum energy-trust integrated value as the aggregation node.

8. The method according to claim 3, wherein the step of selecting an aggregation node according to the energy-trust integrated value for each of the nodes comprises steps of:

comparing the actual trust value of each of the nodes with a threshold value, and acquiring nodes each having the actual trust value larger than the threshold value as candidate nodes; and comparing the energy-trust integrated values for the candidate nodes with each other, and selecting the candidate node having a maximum energy-trust integrated value as the aggregation node.

9. The method according to claim 4, wherein the step of selecting an aggregation node according to the energy-trust integrated value for each of the nodes comprises steps of:

comparing the actual trust value of each of the nodes with a threshold value, and acquiring nodes each having the actual trust value larger than the threshold value as candidate nodes; and comparing the energy-trust integrated values for the candidate nodes with each other, and selecting the candidate node having a maximum energy-trust integrated value as the aggregation node.

10. A device for selecting an aggregation node, comprising:

an acquisition unit, comprising at least one of a central processing unit, a microprocessor and an integrated circuit, configured to acquire a trust value list for each of nodes in a cluster, wherein the trust value list for each of the nodes comprises trust values for each of the nodes, acquired by remaining nodes in the cluster;

a first calculator, configured to calculate an actual trust value for each of the nodes according to the trust value list for each of the nodes, by using a first predetermined algorithm;

a second calculator, configured to calculate an actual remaining energy ratio of each of the nodes according to a self-calculated remaining energy ratio of each of the nodes calculated by itself and other-calculated remaining energy ratios of each of the nodes calculated by the remaining nodes in the cluster, by using a second predetermined algorithm;

a third calculator, configured to calculate an energy-trust integrated value for each of the nodes according to the actual trust value for each of the nodes and the actual remaining energy ratio of each of the nodes, by using a third predetermined algorithm; and a selector, configured to select an aggregation node according to the energy-trust integrated value for each of the nodes, wherein any of the trust values in the trust value list is acquired according to the following steps:

taking a node for which the trust value is to be acquired as a target node, the remaining nodes in the cluster comprising the target node as monitoring nodes, one of the monitoring nodes as a direct monitoring node, and others of the monitoring nodes as indirect monitoring nodes;

acquiring direct information of the target node through the direct monitoring node;

acquiring indirect information of the target node through the direct monitoring node, wherein the indirect information is information of the target node acquired by the indirect monitoring nodes; and calculating the trust value for the target node according to the direct information and the indirect information of the target node which are collected by the direct monitoring node; and wherein the selector is configured to compare the energy-trust integrated values for the nodes with each other, and select a node having a maximum energy-trust integrated value as the aggregation node.

11. The device according to claim 10, wherein the first calculator is configured to calculate, by using an averaging method, an average trust value for each of the nodes as the actual trust value for each of the nodes, according to the trust values in the trust value list for each of the nodes.

12. The device according to claim 10, wherein the selector comprises:

a first comparator, configured to compare the actual trust value for each of the nodes with a threshold value, and acquire nodes each having the actual trust value larger than the threshold value as candidate nodes; and a second comparator, configured to compare the energy-trust integrated values for the candidate nodes with each other, and select the candidate node having a maximum energy-trust integrated value as the aggregation node.

13. The method according to claim 3, wherein the step of acquiring an actual trust value for each of the nodes according to the trust value list for each of the nodes, by using a first predetermined algorithm comprises a step of:

calculating, by using an averaging method, an average trust value for each of the nodes as the actual trust value of each of the nodes, according to the trust values in the trust value list for each of the nodes.

14. The method according to claim 3, wherein the step of calculating an energy-trust integrated value for each of the nodes according to the actual trust value for each of the nodes and the actual remaining energy ratio of each of the nodes, by using a third predetermined algorithm, comprises calculating the energy-trust integrated value $Q_k$ of each of the nodes by using the following equation:

$$Q_K = \varphi \cdot T_k + \theta \cdot \lambda_k$$

where $T_k$ is the actual trust value, $\lambda_k$ is the actual remaining energy ratio, $\varphi$ is a weighted parameter for the actual trust value, $\theta$ is a weighted parameter for the actual remaining energy ratio, $\varphi + \theta = 1$, $0 \leq \theta \leq 1$ and $0 \leq \varphi \leq 1$.

15. The method according to claim 3, wherein the step of selecting an aggregation node according to the energy-trust integrated value for each of the nodes comprises steps of comparing the energy-trust integrated values of the nodes with each other, and selecting a node having a maximum energy-trust integrated value as the aggregation node.

* * * * *